(12) United States Patent
Martin et al.

(10) Patent No.: US 6,640,411 B1
(45) Date of Patent: Nov. 4, 2003

(54) METHOD FOR THE MANUFACTURING OF A MOULD BODY AND A MOULD BODY MANUFACTURED ACCORDING TO THE METHOD

(75) Inventors: Hans Martin, Delsbo (SE); Ove Öhman, Uppsala (SE); Lars Lundbladh, Täby (SE)

(73) Assignee: AMIC AB (SE)

( * ) Notice: Subject to any disclaimer, the term of this patent is extended or adjusted under 35 U.S.C. 154(b) by 0 days.

(21) Appl. No.: 09/913,417
(22) PCT Filed: Feb. 14, 2000
(86) PCT No.: PCT/SE00/00309
§ 371 (c)(1),
(2), (4) Date: Aug. 13, 2001
(87) PCT Pub. No.: WO00/47386
PCT Pub. Date: Aug. 17, 2000

(30) Foreign Application Priority Data

Feb. 12, 1999 (SE) .................................................. 9900464

(51) Int. Cl.⁷ .................................................. B23P 17/00
(52) U.S. Cl. .................... 29/412; 29/455.1; 264/219; 264/297.1
(58) Field of Search .............. 29/412, 455.1, 29/462, 463; 264/219, 297.1, 297.8, 308; 425/500, 515; 249/96

(56) References Cited

U.S. PATENT DOCUMENTS 4,793,953 A    12/1988    Maus ......................... 264/2.5
5,228,188 A  * 7/1993    Badihi et al. .................. 29/623
6,151,775 A  * 11/2000   Sakai ............................ 29/830
6,247,229 B1 * 6/2001    Glenn ........................... 29/841

FOREIGN PATENT DOCUMENTS

| EP | 0547419 | 6/1993 |
| EP | 0844056 | 5/1998 |
| SE | 9800462 | 2/1998 |
| SE | 9800839 | 3/1998 |
| WO | 96/30184 | 10/1996 |

* cited by examiner

Primary Examiner—Gregory Vidovich
Assistant Examiner—Stephen Kenny
(74) Attorney, Agent, or Firm—Ostrolenk, Faber, Gerb & Soffen, LLP (57) ABSTRACT

The invention relates to a method for manufacturing a mould body (40) serving as an original or master or, alternatively, a matrix, said mould body having at least one surface area (41a) in the form of a microstructure, designed so that it can be transferred as a complementary surface area to a matrix or an object. The mould body (40) is constructed from one or more prefabricated discrete elements (41). A base plate belonging to the mould body (40) is applied and secured in at least one of these discrete elements (41). This element shall be provided with said surface area (41a) in the form of a microstructure. A matrix or object formed by the mould body (40) is provided with a complementary microstructured surface area from said discrete elements.

The invention also relates to a mould body produced in this way.

13 Claims, 4 Drawing Sheets

METHOD FOR THE MANUFACTURING OF A MOULD BODY AND A MOULD BODY MANUFACTURED ACCORDING TO THE METHOD

TECHNICAL FIELD

The present invention relates primarily to a method for manufacturing a mould body serving as an original or master or, alternatively, a matrix.

Mould bodies of this type are used preferably in the manufacture of various plastic objects wherein the manufacture may primarily be permitted to occur in die-casting, hob-moulding or injection-moulding equipment.

An original or master must be used to enable the manufacture and shaping of a matrix.

A matrix is used to enable the manufacture and shaping of one or more objects wherein a (negative) surface structure of the matrix will be reproduced against the object as a (positive) complementary surface structure.

More specifically the present invention relates to a method for manufacturing a mould body having at least one, surface area in the form of a microstructure. This surface area shall be so designed that it can be transferred as a complementary surface area to a matrix or, alternatively, an object.

The invention relates secondarily to a mould body, or a mould body arrangement, that can be manufactured by means of the method with at least one chosen surface area formed as a microstructure, designed so that it can be transferred as a complementary surface area to a matrix or, alternatively, to an object.

The method and the mould body produced thereby may be used in the manufacture of an origin al or a master and also in the manufacture of matrices. For the sake of simplicity substantially only the former will be described in the following.

When the mould body in accordance with the invention is used as an original or a master, a surface area of the mould body with a positive microstructure will form a complementary surface area of the matrix with a negative structure, against which the microstructured object can subsequently be formed having a complementary surface area of the object with a positive microstructure.

The terms positive and negative surface structure should be understood in the first place to mean surfaces having irregular microstructures but, in the second place, also plane surfaces.

If the mould body is used for manufacturing a matrix having a surface area with a negative microstructure, objects manufactured via the matrix will have a surface area with a positive microstructure having a pattern complementary to the pattern of the matrix.

A matrix consists of a unit or an arrangement of units designed for use in mould parts for die-casting, hob-moulding and/or injection moulding or equivalent procedure.

BACKGROUND ART

Machines for manufacturing objects in the form of plastic components and the like, based on die-casting, hob-moulding and/or injection moulding or equivalent procedures are already known in various forms.

In the case of die-casting a hot (approx. 400° C.) liquid plastic compound is pressed under high pressure into a cavity defined by mould parts placed together, the plastic compound being allowed to cool to solid form before the mould parts are opened.

Die-casting also includes the insertion of a plastic compound between the mould parts, the plastic compound being caused to cure and solidify by its constituents.

In the case of hob-moulding a solid plastic component is embossed by the structure of the matrix.

In the case of injection moulding the plastic compound is permitted to pass through a nozzle, the peripheral shape of which is reproduced as the cross section of a bar, rod or ribbon.

With machines for die-casting it is known for only one or both mould parts to be provided with one or more matrices and to allow the hot liquid plastic compound to solidify (at approx. 140° C.) between the clamped mould parts before they are opened and the solidified component can be pushed out.

Machines with said mould parts thus comprise one or more matrices with one or more negative surface structures, in order to be able to reproduce the negative surface structure against the plastic component or object as a positive surface structure.

When reproducing a microstructure belonging to the matrix on a plastic component or object manufactured in a machine it is known to first have an original or master manufactured in suitable manner and then manufacture a matrix belonging to and adapted for the machine, from this master.

Although the present invention may be used as an arrangement in a machine for manufacturing objects of substantially optional form, in the form of plastic components, for the sake of simplicity and by way of example, the following description will deal with the manufacture of plastic components having a single surface section provided with a positive microstructure.

A previously known method for having a master or matrix manufactured is to apply and secure a number of units and/or discrete elements on a base plate, forming a desired positive or negative surface structure.

Another previously known method for having a master manufactured is to utilise lithographic methods, in which case it is advantageous to make use of lithographic methods that have been developed primarily within the microelectric field.

A previously known method for the manufacture of an original or master, the manufacture of a matrix and the manufacture of an object, will be described in more detail in the following, with reference to FIGS. 1–3.

It is also known that, when die-casting or hob-moulding plastic components in a machine wherein one or more surface portions of the plastic component shall have a microstructure, mould parts pertaining to the machine using one or more matrices pertaining to the mould parts, must be made from a stable material that will withstand the high pressures prevailing during the manufacturing process and will not become worn unnecessarily quickly by the thermal and mechanical wear to which the mould parts and matrices are subjected during the actual casting process.

Figure 1A:
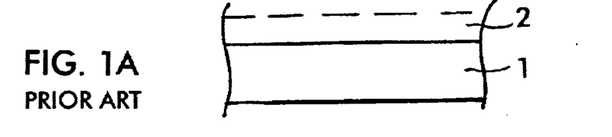
FIGS. 1A–D show in a sequence A–D, a previously known method for manufacturing a complete mould body to form an original or a master.
Figure 1B:
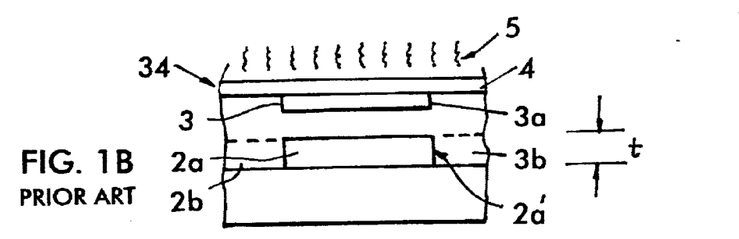
Figure 1C:
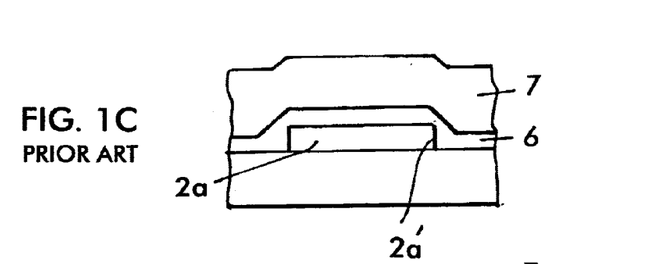
Figure 1D:
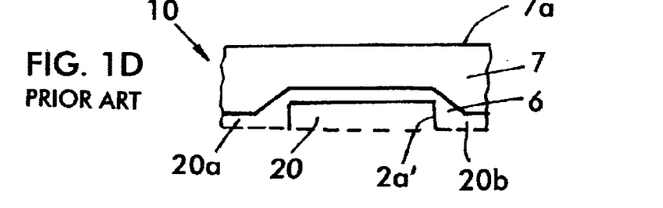
Figure 2:
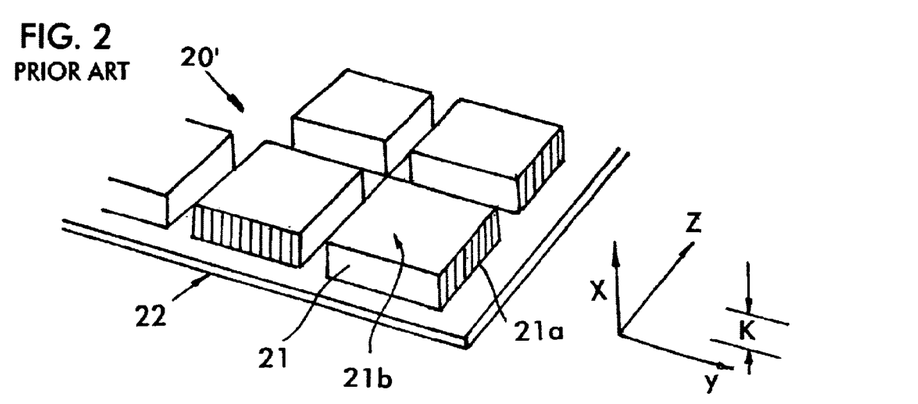
FIG. 2 shows how a matrix can be produced with the aid of this mould body and FIG. 3 shows how, with the aid of said matrix, an object having a cavity can be produced, the narrow wall section of the cavity having been provided with a 2D structure surface area formed to a microstructure.
Figures 3, 3A:
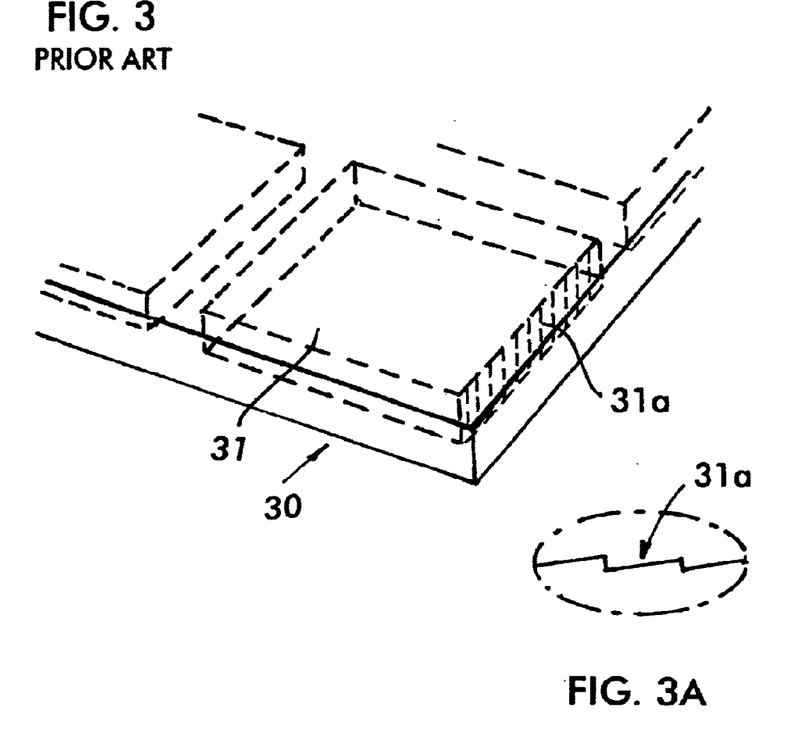
FIG. 3A is an enlargement of a fragment of FIG. 3.

The method shown in FIGS. 1–3 is intended to illustrate the "LiGA method" which is designed to enable the creation of a deep lithograph-related structure with the aid of X-rays, with galvanoplating for plastic casting or embossing.

The known LiGA technology is capable of giving an edge area a shape in a two-dimensional plane corresponding to a silhouette, where the thickness or depth chosen provides the three-dimensional height or structure. In the following this structure is termed a 2D-structure.

The object of the invention is, when necessary, to give the edge area a three-dimensional surface structure, such as a high-rise area, and this will be termed a 3D-structure in the following.

DISCLOSURE OF THE INVENTION

Technical Problems

Taking into consideration the fact that the technical deliberations a person skilled in the relevant art must perform in order to offer a solution to one or more technical problems posed, constitute initially an insight into the measures and/or sequence of measures to be taken, and also a selection of the means required, and as a result thereof the following technical problems are probably relevant to the development of the present invention.

Taking into consideration the background art as described above and as will be explained more fully with reference to the following description of the method illustrated in FIGS. 1-3, it should appear as a technical problem to be able to conceive a method for having a mould body manufactured that serves as an original or master or, alternatively as a matrix, said mould body having at least one surface area formed to a microstructure, wherein this surface area of the mould body is designed to be transferred as a complementary surface area to a matrix or an object, and also a mould body therefor wherein the method and manufacturing procedure is considerably simpler, quicker and/or less expensive than the method shown to be previously known through the LiGA technology.

It is a technical problem to be able, using simple measures, to create such criteria that an object produced, without considerable expense, can show a deep lithograph-related structure, without the need to use X-rays or the like that demand high energy levels.

It is also a technical problem to be able, using simple measures, to create a microstructured edge surface having a width or depth far in excess of a depth obtained by means of the LiGA technology.

It is furthermore a technical problem to be able, using simple measures, to create a microstructured edge surface where the microstructure may deviate from a diffractive structure and/or a plane structure offered by the LiGA technology, such as ridges and grooves oriented at a different angle to the ridges and grooves that can be produced using the LiGA technology.

It is a particular technical problem to be able, using simple measures, to create a surface area for the object, such as to and along the edge of a cavity, that has an intact positive 3D-microstructure.

It is also a technical problem to be able to perceive the significance of and advantages associated with having a number of discrete elements prefabricated in one and the same manufacturing process, and to select the thickness of each discrete element by cutting a slice from a machined blank or, in the manufacturing process, machine the thickness for a plurality of such discrete elements.

A technical problem also lies in being able, using simple means and measures, to produce the mould body with the aid of a cut slice, the thickness of which is designed to create the depth dimension of a cavity and, with the positive microstructure of the object well adapted, to be able to cover the entire surface area corresponding to the chosen depth dimension.

A technical problem also lies in being able to perceive the technical design measures required for the mould body in order to obtain an object-related microstructured surface area capable of having a larger and more exactly shaped 3D surface structure than can be achieved using the previously known LiGA method.

A technical problem also lies in being able to perceive the significance of and the advantages associated with applying and securing at least one prefabricated discrete element to the base plate of a mould body in order to produce a cavity or elevation, such as a plateau, pertaining to the object.

A technical problem also lies in being able to perceive the significance of and the advantages associated with allowing this element to be provided with one or more of said surface areas formed to a microstructure, by producing said surface areas by means of simple, known procedures.

It is furthermore a technical problem to be able to perceive the advantages associated with allowing said surface area for the element, formed to a microstructure, be edge-oriented and/or surface-oriented.

Advantages are to be gained from being able to utilise one or more discrete elements since selected surface areas can then easily be formed when the element is separated from the base plate, and can also be formed by means of simple, known measures, such as forming a 2D structure, a 3D structure and/or a surface co-ordination and/or surface separation thereof.

A technical problem lies in being able to perceive the significance of and the advantages associated with allowing a matrix or an object produced by such a mould body, to be provided with one or more complementarily shaped microstructured surface areas from said discrete elements firmly related to the base plate.

A technical problem also lies in being able to perceive the significance of and the advantages associated with allowing the surface area of the discrete element formed to a microstructure to be designed with a distinct edge or rim extension fitting to the base plate.

A technical problem also lies in being able to perceive the significance of and the advantages associated with allowing the surface area formed to a microstructure to be chosen to have at least one surface area with 2D structure designed for diffractive optical properties, preferably wall-related.

A technical problem also lies in being able to perceive the significance of and the advantages associated with allowing said surface area formed to a microstructure to be chosen to have at least one surface area with 3D structure designed for sensor-active properties, preferably wall-related.

It is also a technical problem to be able to perceive the significance of and the advantages associated with allowing each, or at least some of said discrete elements to be chosen as a slice cut from a longitudinally extending bar with a surface width or surface extension along the bar, having 2D structure and/or 3D structure, formed to a microstructure.

A technical problem also lies in being able to perceive the significance of and the advantages associated with allowing each of said discrete elements to be chosen as a part of or a slice cut from a solid of revolution with a surface width or surface extension along the solid of revolution formed to a microstructure.

A technical problem also lies in being able to perceive the significance of and the advantages associated with allowing said surface width with 2D structure formed to a microstructure to be produced from said solid of revolution by means of turning with the aid of a diamond bit.

A technical problem also lies in being able to perceive the significance of and the advantages associated with allowing a lathe tool tip provided with a diamond to be shaped so that, in combination with the feeding movement of the lathe tool, it can produce one or more surface widths with 2D structure surrounding the solid of revolution.

A technical problem also lies in being able, using simple measures, to create such criteria that the surface structure of the surface width can easily be adjusted to reveal diffractive optical properties.

It constitutes a technical problem in being able, using simple measures to create a number of identical discrete elements in one and the same manufacturing process and, using a lathe tool, turn the thickness for each discrete element inserted in a fixture belonging to the chuck.

Said surface width, such as the one with diffractive properties, should preferably be capable of being delimited by parallel-related, or at least substantially parallel-related, section surfaces for the solid of revolution in order to produce said discrete elements and with defined edge-related surface areas.

A technical problem also lies in being able to specify a mould body arrangement with at least one surface area formed to a microstructure and where the surface area of the mould body is designed to be transferred to a matrix or, alternatively to an object, thereby indicating the possibility of building up the mould body and/or mould body arrangement from several, at least two, parts—a base plate and at least one prefabricated discrete element—where also a base plate can be applied and/or secured in at least one such discrete element, where at least said element shall be provided with at least one surface area in the form of a 2D microstructure.

A technical problem also lies in being able, with a mould body of the kind described in the introduction, to allow said element to be provided with at least one complete surface area in the form of a microstructure when the element is applied on the base plate.

A technical problem also lies in being able, using simple means, to create such criteria that the surface area pertaining to said discrete element and in the form of a microstructure can be adapted to fit directly onto an upper surface of the base plate by means of a distinct edge or rim extension.

A technical problem also lies in being able to perceive the significance of and the advantages associated with, in a simple manner, allowing said surface area formed to a microstructure to be provided with at least one surface area designed for diffractive optical properties and where said surface area can be wall-related to said discrete elements.

A technical problem also lies in being able to perceive the significance of and the advantages associated with said surface area formed to a microstructure being provided with a surface area with 2D and/or 3D structure, designed for sensor-active or other properties, where said surface area preferably can be wall-related to said discrete elements.

A technical problem also lies in being able to perceive the significance of and the advantages associated with allowing said discrete elements to consist of a thin slice from a longitudinally extending bar having a surface width formed to a microstructure along the bar.

A technical problem also lies in being able to perceive the significance of allowing said discrete element to consist of a thin slice from a solid of revolution having a surface width formed to a microstructure oriented about the solid of revolution.

A technical problem also lies in being able to perceive the significance of and the advantages associated with allowing at least the surface area of the base plate facing the discrete element to be provided with a wear-and-release layer designed for manufacturing a matrix or an object.

A technical problem also lies in being able to perceive the significance of and the advantages associated with allowing at least the surface area of said elements formed to a microstructure to be provided with a wear-and-release layer designed for the manufacture of a matrix or an object.

Solution

For solving one or more of the above technical problems the present invention proposes a method for manufacturing a mould body serving as an original or master or, alternatively, as a matrix, said mould body having at least one surface area in the form of a microstructure, designed so that it can be transferred to a matrix or an object, the latter via plastic moulding, plastic embossing and/or injection moulding. In such a method, the invention particularly states that a base plate be applied and secured in at least one prefabricated discrete element.

This element shall be provided with said surface area with 2D and/or 3D structure, in the form of a microstructure, and a matrix or object formed by the mould body shall be provided with a complementary microstructured surface area from said discrete element.

As preferred embodiments falling within the scope of the inventive concept it is stated that the surface area belonging to the discrete element and formed to a microstructure shall be adapted to fit onto the base plate by means of a distinct edge or rim extension.

It is also stated that a surface area in the form of a 2D structured microstructure shall be chosen to reveal a surface area for diffractive optical properties, preferably wall-related.

It is furthermore proposed that a surface area in the form of a 3D-structured microstructure shall be chosen to reveal at least one surface area designed for is sensor-active properties, preferably wall-related.

The invention particularly states that said discrete element may be chosen as a slice cut from a longitudinally extending bar with a surface width or surface extension along the bar formed to a microstructure or, alternatively, said discrete element may be chosen as a part of, or a slice cut from a solid of revolution having a surface width about the solid of revolution formed to a microstructure.

In the latter application it is proposed according to the invention that said surface extension in the form of a microstructure is produced by means of turning in a lathe with diamond bit.

It is here specified that a lathe tool tip of diamond material, suitable for turning, shall be shaped so that, in combination with the feeding movement of the lathe tool, it can produce one or more surface extensions on the solid of revolution.

It is in particular proposed that the surface structure of a surface extension shall be designed to reveal diffractive optical properties.

If said discrete element is chosen as a part or a slice cut from a solid of revolution, it is stated that said surface area for the discrete element shall be defined by parallel-related or substantially parallel-related section surfaces for the solid of revolution.

The present invention also relates to a mould body having at least one surface area in the form of a microstructure, where the surface area, etc. of the mould body is designed so that it can be transferred as a complementary surface area to a matrix or, alternatively, to an object.

In such a mould body it is stated that at least one prefabricated discrete element is applied and/or secured to a base plate, and that said element is provided with said surface area in the form of a microstructure.

As preferred embodiments falling within the scope of the inventive concept it is stated that said element shall be provided with a complete surface area in the form of a microstructure when the element is applied on the base plate.

It is also stated that the surface area pertaining to said discrete element and in the form of a microstructure is adapted to fit directly onto an upper surface of the base plate by means of a distinct edge or rim extension.

It is also stated that said surface area formed to a microstructure shall be provided with a surface area designed for diffractive optical properties.

The opportunity is particularly offered of allowing said surface area to be wall-related to said discrete element.

Said surface area formed to a microstructure is provided with a surface area designed for sensor-active properties.

Said surface area shall also preferably be wall-related to said discrete element.

The invention particularly recommends that said discrete element shall consist of a dimensioned thin slice from a longitudinally extending bar having a surface width and surface extension along the bar, formed to a microstructure.

Said discrete element consists of a thin slice from a solid of revolution.

The invention is also based on at least the surface area of the base plate facing the discrete element being provided with a layer designed for the manufacture of a matrix or an object.

Over and above it is stated that at least the surface area of said elements formed to a microstructure shall be provided with a layer designed for the manufacture of a matrix or, alternatively, an object.

Advantages

The advantages that can be considered most significant for a method for manufacturing a mould body serving as an original or master or, alternatively, as a matrix, and a mould body that can be manufactured in accordance with the method are thus that criteria have been created, using simple measures and means, to enable desired mould bodies to be combined by combining a number of prefabricated discrete elements formed to a microstructure, and applying or securing these to a base plate.

The opportunity is thus offered of forming and machining the prefabricated discrete element in order to produce a surface area or areas, formed to a microstructure, and to choose the wall thickness of the discrete element corresponding to the depth of a cavity or the height of an elevation formed by the element in a matrix or object.

The invention also offers the opportunity of allowing the surface area pertaining to the discrete element, and formed to a microstructure, to be designed having a distinct edge extension to fit the base plate.

The features that can primarily be considered characteristic of a method for manufacturing a mould body serving as an original or master or, alternatively, as a matrix, said mould body having at least one surface area formed to a microstructure, are defined in the characterizing part of the appended claim 1 and the features that can primarily be considered characteristic of a mould body having at least one surface area formed as a microstructure, are defined in the characterizing part of the appended claim 12.

BRIEF DESCRIPTION OF THE DRAWINGS

A currently proposed embodiment of a known, method for manufacturing a complete mould body serving as an original or a master, and a method for the same purpose but specifying the properties significant to the present invention, as well as a mould body manufactured in accordance with the principles of the invention, will now be described more fully with reference to the accompanying drawings in which.

DESCRIPTION OF A PREVIOUSLY KNOWN METHOD FOR MANUFACTURING A MOULD BODY

In FIG. 1 the positions of FIGS. 1A, B, C and D show a sequential course of events for manufacturing a mould body 10 serving as an original or master or, alternatively, as a matrix, said mould body having at least one (positive) surface area 2a' formed to a 2D microstructure and designed to be transferred to a matrix as a complementary surface area 21a having 2D structure.

Position A illustrates a substrate 1, such as titanium, coated with a plastic material 2, degradable by X-rays, in the form of a layer with a typical thickness of about 3 mm or less.

Position B illustrates that a lithographic mask 34 is applied above this layer, the mask having one or more discrete sections, such as the section 3 of gold, applied to a film 4 such as a hapton film.

The layer 2 is now illuminated with the aid of parallel X-rays 5, through the mask 34, and the X-rays are prevented from passing through the discrete section 3 and form an unaffected layer area. 2a in the layer 2 below.

The X-rays 5 pass through the film 4 in the surface areas of the layer 2 that are not shadowed by the discrete layer 3, and degrade the layer section 2b.

The maximum thickness (t) of the layer 2 is dependent on the energy supplied by the X-rays 5 and the thickness is thus in practice limited to less than 2 mm, perhaps 3 mm exceptionally.

In a process step not shown, the degraded layer sections 2b are removed and only a number of layer areas that have not been affected, like the area 2a, remain on the substrate 1.

To further illustrate the known technology, the discrete section 3 shows a defining rim surface 3a having a 2D microstructure designed to be able to offer diffractive optical properties in the embodiment shown.

The rim surface 3a will now be transferred to the layer 2 as a silhouette with the-aid of the X-rays 5, and therefore forms a rim surface 2a' with a 2D surface structure.

The surface structure of this rim surface will now be identical for every plane oriented perpendicular to the X-rays 5.

It should be noted here that the rim surface 2a' can only consist of a plane surface or a number of parallel-related grooves and ridges oriented in the direction of the X-rays, and after a known surface treatment it will form a surface with diffractive optical properties.

Position C illustrates that a layer 6, such as in the form of nickel, is applied to the substrate 1 and over the section 2a through a known plating procedure.

Position C also illustrates how another layer 7, such as a layer of copper, is applied on top of the nickel layer 6.

The upper surface 7a is thereafter made level and plane for the copper layer and the titanium material of the substrate 1 is removed by means of etching by known means, and the layer area 2a is removed to form a cavity 20 in the nickel layer 6.

It is thus shown in position D that an original or a master 10 is manufactured having a recess or cavity 20 with an edge area having a 2D-microstructured surface as a rim surface 2a'.

It is obvious that instead of having a recess 20, the original may be shaped with a protruding plateau, a ridge 20a, 20b or the like.

From the original or master 10 manufactured here, position D in FIG. 1, a matrix 20 can be produced by means of plastic moulding or a similar procedure.

Such a matrix 20' is shown in perspective in FIG. 2 where a plateau part 21 corresponding to the cavity 20 is integrated with a base plate 22 and where a chosen surface area 21a, a rim area, is produced as a complementary surface to the rim or surface area 2a'.

Significant for this LiGA technology is that if a single master is to be provided with a number of cavities, such as the cavity 20, these must be formed as laterally oriented cavities (not shown in FIG. 1), i.e. oriented in rows and columns, in the master 10.

FIG. 2 illustrates that the master 10 has been formed with a number of cavities oriented in rows and columns and a number of plateau parts in which the cavity 20 forms the plateau part 21, have been produced in rows and columns.

There is nothing to prevent a microstructure being created through this LiGA technology showing a surface area on the upper surface 21b of the plateau part 21 and/or on edge areas other than the edge area 21a shown in the drawing.

It is clear from FIG. 2 that the negative surface structure 21a (and similarly the positive surface structure 2a') can be given a variation in the y-z-plane depending on the shape of the edge 3a and the silhouette or silhouette edge produced thereby.

Variation in the x-y-plane is only possible with a chosen variation in the thickness -k- and thus in the thickness of layer 2.

The surface 21a is thus deemed to have two-dimensional surface structure, 2D-structure.

FIG. 3 shows how a matrix 20', according to FIG. 2, is used to form an object 30 in the form of a number of cavities opening downwardly in a plastic component. One of the cavities has been designated 31 and this cavity has a surface area 31a with 2D structure formed to a microstructure, that constitutes a complementary, positive surface area to the surface area 21a.

This known LiGA technology offers a method which is limited in that the maximum depth (in x-direction) of a cavity is determined by the ability of the X-rays 5 to degrade the plastic material 2 while, at the same time, the microstructure 2a' of the edge areas is limited to being able to correspond only to a silhouette of a surface 3a.

Description of Embodiment now Proposed

A method in accordance with the invention will now be described more fully with reference to FIG. 4, for manufacturing a mould body 40 serving as an original or master or, alternatively, as a matrix.

Figure 4:
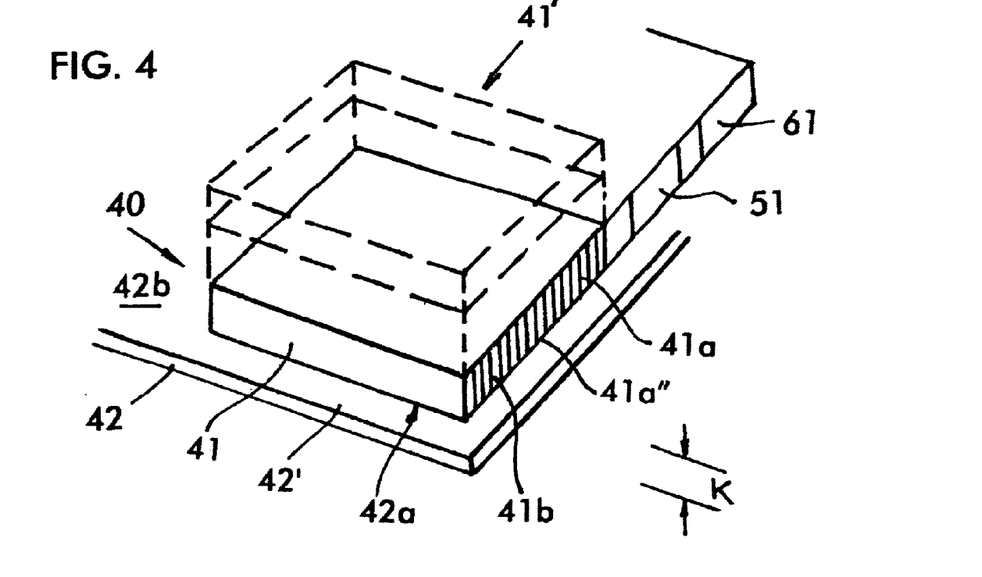
FIG. 4 shows in perspective a method according to the invention for manufacturing a mould body serving as an original or master or, alternatively, a matrix, with one or more discrete elements applied on a base plate.

The following description assumes that FIG. 4 shows the construction of a matrix and a comparison can therefore be made with FIG. 2, entirely ignoring the production according to FIGS. 1 to 3.

This mould body 40 is to be manufactured by allowing one or more prefabricated discrete elements 41 to be applied on a base plate 42.

The prefabricated discrete elements may be shaped differently or the same and are to be combined here to form a plateau (or cavity) on the base plate 42 with a form complementary to the desired form of a plastic object moulded against it.

For the sake of simplicity, FIG. 4 aims only to show in more detail that a discrete element 41 in the form of a right-angled prism is secured to a base plate 42.

The complete prefabricated discrete element 41 is also shown in FIG. 4 in an upper position 41', indicated in broken lines, a position it will assume before it is secured to the base plate 42.

The object of the invention is to manufacture a number of discrete elements, preferably identical, in a single manufacturing or machining process, or at least in only a few manufacturing or machining processes.

Figures 5, 6:
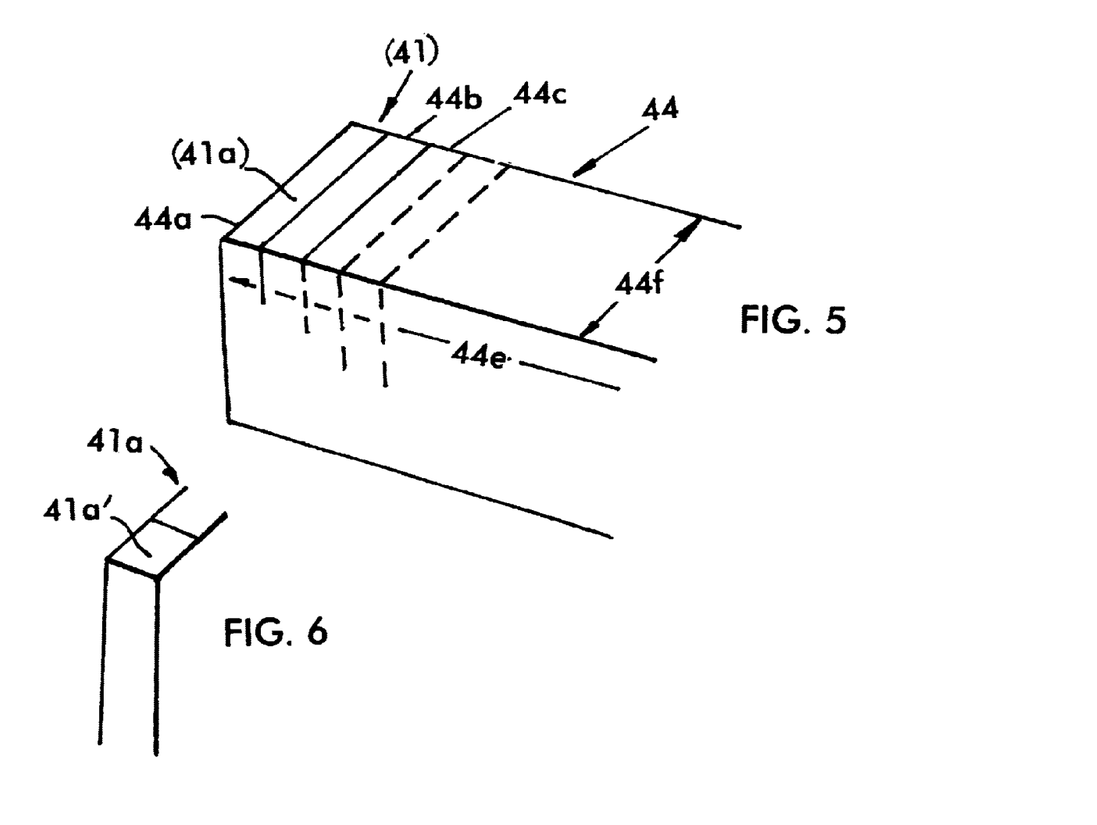
FIG. 5 shows in perspective a longitudinally extending bar, where a number of discrete elements, suitable for the mould body, can be chosen as slices cut from said longitudinally extending bar, with a surface width along the bar formed to a microstructure.
FIG. 6 shows in perspective a cut slice with only a part of the edge section showing a microstructure.
Figure 7:
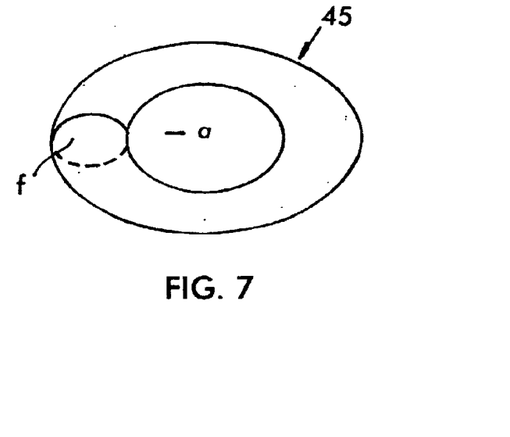
FIG. 7 shows in perspective a solid of revolution illustrated as a toroid.
Figure 8:
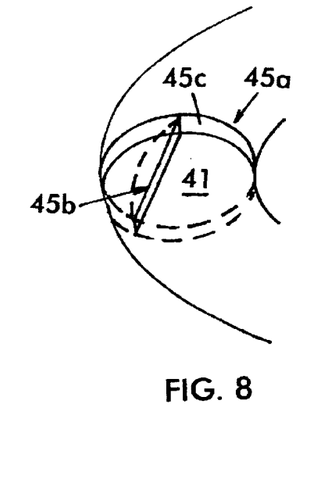
FIG. 8 shows in perspective an embodiment in which said discrete elements can be chosen as a part or a slice cut from a solid of revolution with a surface width formed to a micro structure about the solid of revolution.

These can then be manufactured integrating with each other as illustrated in FIGS. 5, 7 and 8, and where an element can be formed from a slice cut from a bar or a toroid.

Figure 11:
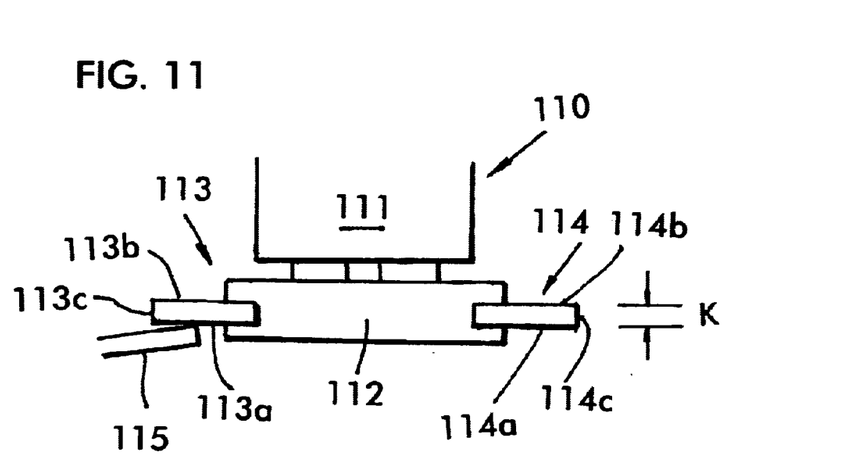
FIG. 11 shows a view from above of a chuck in a lathe, where a fixture supports a number of individual discrete raw material pieces which, after turning and possibly further machining, can form discrete elements.

These can also be manufactured by means of a manufacturing or machining process in which a plurality of individual elements in the form of raw materials are machined simultaneously in a lathe, for instance, according to FIG. 11.

As previously shown with the known technology, this mould body 40 shall be provided with at least one surface area 41a in the form of a microstructure so that it can be transferred to an object as a complementary surface area.

If the surface 41a is chosen with a 2D structure as in FIG. 2, objects 30 can be manufactured using a single matrix.

If the surface area 41a is to have a different 2D structure, or 3D structure, the matrix must be made in two or three parts, in a manner known per se.

For the sake of simplicity FIG. 4 can be compared with FIG. 2, but with the difference that according to the present invention an initial separation of a discrete element 41 and base plate 42 is required so that the microstructured surface portions of the discrete element 41 can be formed by suitable methods and means without regard to the base plate 42.

In the procedure or method according to the invention the mould body 40 shall consist of several parts. This is illustrated in FIG. 4, in a simplified manner, as a base or bottom plate 42 with a discrete element 41 secured thereto, where these parts can be combined to form a mould body unit.

The base plate 42 shall thus consist of a unit and be manufactured in one or more parts.

The base plate 42 should be sturdily dimensioned or well supported in order to absorb the compressive forces occurring when the mould body is used as a matrix.

It is also proposed that the upper surface area 42' of the plate 42 is provided with a layer 42b with high wear resistance and the ability to absorb mechanical thermal stresses.

The plate 42 may thus be manufactured in a material and with a layer 42b that need not be coordinated with the material and the layers for the discrete element 41.

The used discrete element or elements such as the element 41 may also be manufactured in one or several parts.

The element 41 shall be dimensioned so that, together with the base plate 42, it can absorb the compressive forces occurring in a machine when the mould body is used as a matrix.

It is also proposed that the microstructured surface area 41a be provided with a layer 41b that has high wear resistance and the ability to absorb mechanical thermal stresses.

The discrete element 41 may thus be manufactured in a material and with a layer 41b that, at least over the microstructured surface area 41a, need not be coordinated with the material and the layer 42b in the base plate 42.

FIG. 4 thus illustrates that one or more discrete elements 41 shall be applied against a base plate 42 pertaining to the mould body 40, and secured to an adapted surface portion 42a oriented along the upper surface area 42' of the base plate.

FIG. 4 shows that a complete discrete element 41' is placed somewhat above the upper surface 42' of the base plate 42 and that it shall be lowered towards the surface portion 42a and secured to the bottom plate 42. The latter position is indicated with unbroken lines in FIG. 4.

In the embodiment described here the plastic moulded object will, as in FIG. 3, have a cavity with a shape fitting the complementary shape of the element 41.

In practical application the shape of the element may vary and deviate considerably from that shown schematically here.

The element 41 shall now have an edge-related surface area 41a formed to a microstructure, but in which the form and structure of the surface area 41a have been produced in a separate manufacturing process.

The choice of manufacturing process depends on various factors whereas the surface intended for the machining can be fully exposed.

The method according to FIGS. 1–3 could thus also be used—particularly if it is a question of providing the whole, or only parts of the surface area 41a with a topographical surface structure.

Methods shown and described in Swedish patent applications No. 9800462-5 (corresponding to International patent application PCT/SE 99/00145) and No. 9800839-4 (corresponding to International patent application PCT/SE 99/00146) may also be used. Particularly if the whole or parts of the surface areas are to be given sensor-sensitive properties and a 3D structure.

The invention also reveals the possibility of having a surface extension and/or surface width on a substrate machined to a desired microstructure and thereafter cutting the substrate so that a cut slice will have a chosen surface area delimited from the surface width, where the thickness of the cut slice is adjusted to the desired depth for the cavity 31.

Some currently preferred embodiments in this respect will be described in the following with reference to FIGS. 5, 6, 7 and 8.

According to the invention, thus, any suitable procedure whatsoever can be used to manufacture surface areas formed to a microstructure.

A considerably more complicated microstructure can therefore be offered, using simple means, than can be achieved via the X-ray silhouette in position B of FIG. 1.

The discrete element 41 shall thus be applied on and secured to the base plate 42, and this can be done using means known per se, not described in further detail here. Suitable means include a screw joint, pasting or gluing or the like.

It is now obvious that this element 41, with said surface area 41a formed to a microstructure, secured to the base plate 42 will form a mould body 40 and that the use of this mould body 40 to produce a matrix or, alternatively, an object will result in the latter having at least one surface area 31a formed to a microstructure, complementary to the surface area 41a of said discrete element, as shown and described in conjunction with FIG. 3.

According to the present invention the surface area 41a of the discrete element 41, formed to a microstructure, will be particularly suited for connection via a distinct edge or rim extension 41a", to the upper surface 42' of the base plate 42.

This therefore guarantees that the whole surface 41a will be transferred to the matrix or, alternatively, the object 31 as an accurate complementary surface 31a.

The embodiment according to FIGS. 1–3, 7 and 8 illustrates that a surface area 41a formed to a microstructure can be chosen to have a, preferably wall-related, surface area 31a with 2D structure suited to diffractive optical properties.

According to the invention the surface area 41a according to FIG. 5 or FIG. 6 may reveal a surface area 41a' with 3D structure, preferably wall-related, suited to sensor-active properties, a more complicated surface structure than is required for only diffractive properties according to FIGS. 1–3, for the surface area 21a.

Since a surface extension and/or surface width can be machined entirely exposed with known means, they can be provided wholly or partially with 2D structure and 3D structure intended to extend over several elements.

The invention now shows according to FIG. 5 that said discrete elements can be chosen as a slice 44a, 44b, 44c cut from a longitudinally extending bar or ribbon 44 having an upper surface extension 44e formed to a unique microstructure and with a surface width 44f along the entire bar 44.

FIGS. 7 and 8 show that said discrete element 41 can be chosen as a part or a slice cut from a solid of revolution 45, with a surface extension around the entire solid of revolution formed to a microstructure.

The bar 44 with the surface extensions 44e and 44f formed to a microstructure can be manufactured in various ways, as described earlier.

The LiGA process can be used if only diffractive optical properties are required. However, a different manufacturing method, such as that shown in the Swedish patent applications mentioned above, is necessary if sensor-active properties are required as optical properties.

A solid of revolution 45 may be produced by causing a closed, plane figure f to rotate 360 degrees about an axis a, the latter lying both in the plane of the figure f and also does not intersect the figure in question, in accordance with FIG. 7.

FIG. 8 illustrates how a slice 45a from a solid of revolution 45 may be provided with a polished outer surface 45c and that a surface 45b is turned with a turning tool provided with a diamond, to a diffractive surface.

Figure 10:
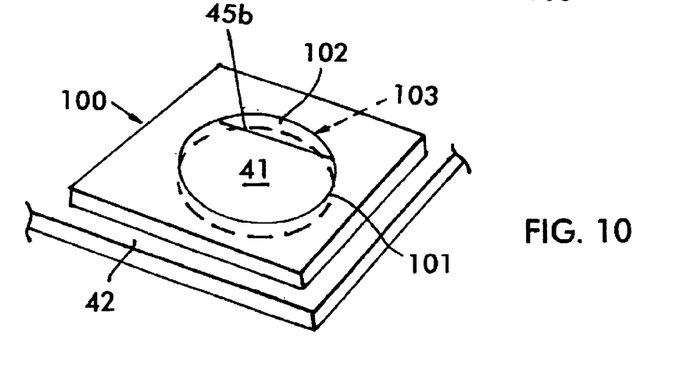
FIG. 10 shows the construction of a mould body in accordance with FIG. 9, from a number of discrete elements, to produce an object with a plateau as a matrix.

According to FIG. 10 the slice 41 is placed in a circular recess 101 in a plate 100, and a transparent plastic material is applied in the empty space 102.

The surface 45b now provides a complementary surface 103a for an object 103.

Figure 9:
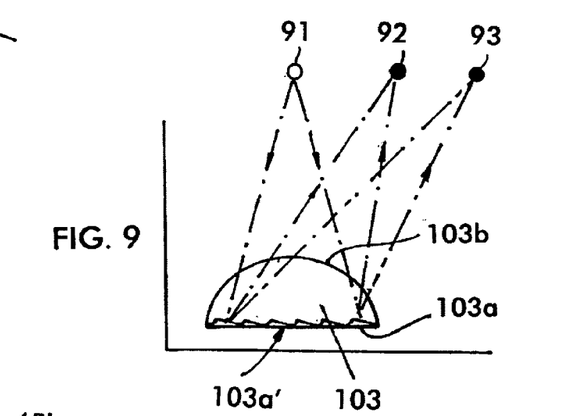
FIG. 9 shows an application in which a light source emitting several wave lengths illuminates a diffractive plane surface to enable light intensities separated into different wave lengths to be sensed in different receivers.

As shown in FIG. 9, this object 103 can now be illuminated from a light source 91 with a light comprising several wave lengths.

The light from the light source 91 passes a refractive surface 103b, is deflected in this surface towards a diffractive surface 103a which has been coated with a light-reflecting layer 103a', and reflects against a number of light receivers, two of which have been designated 92 and 93, for wave-length separation.

A diamond-tipped turning tool is provided so that, in combination with the radial or axial feeding movement of the lathe tool, it can form one or more circumferential surface extensions on the solid of revolution, some of these producing the surface part 45b. In this application the surface extension of the surface area can easily be adapted to reveal diffractive optical properties.

The surface area 45b, cut from a circumferential surface extension for the separate discrete element 41, is defined by parallel-related, or at least substantially parallel-related section surfaces for the solid of revolution 45.

The invention in accordance with FIG. 10 is thus also based on a mould body composed from a plurality of parts and components, having at least one surface area, formed to a microstructure, designed so that it can be transferred as a complementary surface area to a matrix or, alternatively, an object.

It is thus clear that the base plate 42 can be applied to a plurality of discrete elements located side by side, with or without surface areas formed to a microstructure, in order to combine discrete elements 41, 51, 61 on the base plate 42 to enable complementary surfaces of a different structure from that shown for the element 41 to be transferred to the matrix or, alternatively, the object.

Even though the delimiting surfaces for the elements in FIG. 4 have been shown as having right angles, it is obvious that, within the scope of the invention, the elements could have curved or angular delimiting surfaces.

FIG. 4 can be considered to illustrate that said surface area 41a formed to a microstructure is provided with one or more surface areas adapted for diffractive optical properties, whereas a surface area formed to a different surface structure may be provided with one or more surface areas for sensor-active optical properties.

According to the invention the discrete element 41 of the mould body 40 may consist of a cut slice, the thickness -k- of the slice thereby determining the depth of the cavity. In a sensor application this will in practice be up to 5 mm.

FIG. 11 is intended to illustrate that a plurality of separate pieces of raw material for discrete elements are retained in a fixture which is secured in known manner to the chuck 111 of a lathe 110.

The lathe should preferably be a precision lathe, such as one provided with a diamond bit.

It is assumed that the various raw materials are tightly oriented and retained by the fixture 112 so that they will be oriented in radial direction.

FIG. 11 shows only two of these raw materials 113 and 114, and a lathe tool 115.

FIG. 11 illustrates how the lathe tool planes the side surfaces 113a, 114a of the raw materials 113 and 114 and how the thickness -k- of the element is produced through corresponding planing of the lateral surface 113b and 114b.

The surfaces 113c and 114c may be turned here in the manner shown in FIG. 8 to form a 2D structure.

Alternatively the planed raw materials 113 and 114 may be removed from the fixture 112 and placed close together to form a rod suitable for joint machining to a number of discrete elements 41, as shown in FIG. 5.

The invention is naturally not limited to the embodiments described above and given as examples only, but may undergo modifications within the scope of the inventive concept illustrated in the appended claims.

What is claimed is:

1. A method for manufacturing a mould body serving as an original or master or, alternatively, as a matrix, said mould body having at least one surface area in the form of a microstructure, designed so that it can be transferred as a complementary surface area to a matrix or, alternatively, an object, characterized in that a plurality of prefabricated discrete elements are produced, that a base plate belonging to the mould body is applied and secured to at least one of these discrete elements, that this element is provided with said surface area in the form of a microstructure and that a matrix or object formed by the mould body is provided with a complementary microstructured surface area from said discrete element.

2. A method as claimed in claim 1, characterized in that the surface area belonging to the discrete element and formed to a microstructure is adapted to fit onto the base plate by means of a distinct edge or rim extension.

3. A method as claimed in claim 1, characterized in that said surface area in the form of a microstructure is chosen to entirely or partially reveal a surface area with 2D structure.

4. A method as claimed in claim 1, characterized in that said surface area in the form of a microstructure is chosen to entirely or partially reveal a surface area with 3D structure.

5. A method as claimed in claim 1, characterized in that said discrete element is chosen as a slice cut from a longitudinally extending bar with a portion of a surface extension along the bar formed to a microstructure.

6. A method as claimed in claim 1, characterized in that said discrete element is chosen as a part of, or a slice cut from a solid of revolution having a portion of a surface extension about the solid of revolution formed to a microstructure.

7. A method as claimed in claim 6, characterized in that said solid of revolution is formed by a closed plane figure being caused to rotate 360° about an axis lying both in the plane of the figure and situated so that it does not intersect the figure in question.

8. A method as claimed in claim 6, characterized in that said surface extension in the form of a microstructure is produced by means of a diamond lathe.

9. A method as claimed in claim 6, characterized in that a lathe tool tip provided with a diamond, suitable for diamond turning is shaped so that, in combination with the feeding movement of the lathe tool, it can produce one or more surface extensions on the solid of revolution.

10. A method as claimed in claim 9, characterized in that the surface structure of a surface extension is adjusted to reveal diffractive optical properties and that said surface area for the discrete element is defined by parallel-related or substantially parallel-related section surfaces for the solid of revolution.

11. A method as claimed in claim 1, characterized in that a number of pieces of raw material are secured in a chuck in a lathe and that the machining of these raw blanks produces a number of discrete elements as finished or semi-finished products.

12. A method as claimed in claim 2, characterized in that said surface area in the form of a microstructure is chosen to entirely or partially reveal a surface area with 2D structure.

13. A method as claimed in claim 2, characterized in that said surface area in the form of a microstructure is chosen to entirely or partially reveal a surface area with 3D structure.

* * * * *